Sept. 15, 1936.  H. J. LUDEWIG  2,054,383
WIND POWER APPARATUS
Filed March 30, 1936
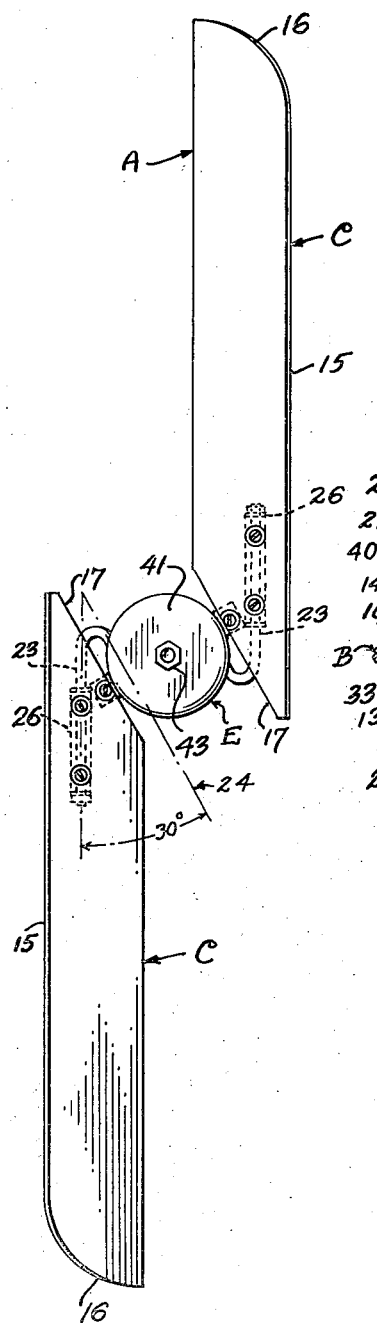
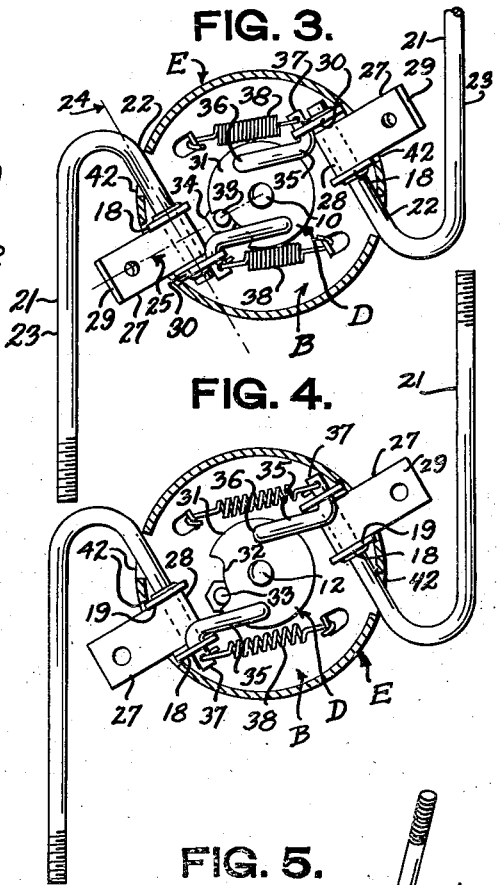
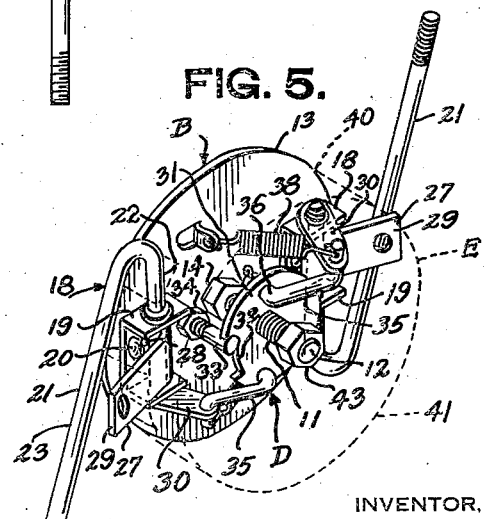
INVENTOR,
Hercel J. Ludewig
BY Lancaster, Allwine and Rommel
ATTORNEYS.

Patented Sept. 15, 1936

2,054,383

UNITED STATES PATENT OFFICE 2,054,383

WIND POWER APPARATUS

Hercel Joseph Ludewig, Pittsville, Wis.

Application March 30, 1936, Serial No. 71,784

6 Claims. (Cl. 170—62)

This invention relates to improvements in wind power apparatus and a primary object is to provide an apparatus having wind rotated blades so mounted as to be self-governing in that their speed of rotation will be practically constant even though the wind velocity may vary considerably.

Another object of the invention is to provide a wind power apparatus wherein the pitch of the blades will be automatically regulated to suit the velocity of the wind by the action of the wind upon the blades and by the centrifugal force created upon rotation of the blades.

A further object of the invention is to provide apparatus of the class described including a blade controlling mechanism which may be adjusted to alter the pitch of the blades.

A still further object of the invention is to provide a self-governing wind power apparatus having relatively few moving parts.

Another object of the invention is to provide an apparatus of the character described provided with a protective housing enclosing the blade controlling mechanism and preventing the formation of ice on the moving parts thereof.

Other objects and advantages of the invention will become apparent during the course of the following detailed description, taken in connection with the accompanying drawing, forming a part of this specification and in the drawing:—

Figure 1 is a front elevation of the improved wind power apparatus and showing the blades in a normally pitched position.

Figure 2 is a side elevation of the improved wind power apparatus and showing the blades in a normally pitched position, the dotted lines representing the position of the blades when the pitch thereof has been reduced to approximately zero due to the action thereon of an extremely high wind.

Figure 3 is a vertical sectional view of the blade controlling mechanism with the blades detached and showing the relative position taken by the parts thereof when the blades are in a normally pitched position.

Figure 4 is a view similar to Figure 3 but showing the relative position of the parts when the pitch of the blades has been reduced to approximately zero.

Figure 5 is a perspective view of the blade controlling mechanism with the blades detached and with the parts relatively positioned as in Figure 3.

In the drawing, wherein for the purpose of illustration is shown only a preferred embodiment of the invention and wherein similar reference characters may designate corresponding parts thruout the several views, the letter A may generally designate the improved wind power apparatus comprising an axle and hub assembly B supporting a pair of hinged blades C, blade control mechanism D and a protective cover E.

Referring first to the axle and hub assembly B, it may include a suitable axle 10 provided with threads 11 extending inwardly of its end 12. A hub 13 may be fixed on the axle inwardly of the end 12 as by suitable nuts 14 threaded on the axle at opposite sides of the hub.

The blades C may be elongate and of substantially plane formation and the leading edges 15 may be beveled if desired. Each blade may be provided with a suitably rounded end 16 and an oblique end 17. In the example shown, the ends 17 are at an angle of 30° to the longitudinal axes of the blades. The blades C may each be obliquely hinged to the hub 13 so that they will swing into and out of a plane radial to the axle. For this purpose a pair of suitable hinges 18 may be provided each of which may include a U-shaped bracket 19 riveted as at 20 to the hub 13 and carrying a rod 21. The rod 21 may be bent so that one end portion 22 will form an angle other than a right angle with the opposite end portion 23, and in the example shown, an angle of 30° is formed. The portion 23 is adapted to swing or hinge on the bracket 19 with the portion 21 turning on the axis 24. This axis 24 may be in a plane perpendicular to a radius 25 of the hub but it is to be distinctly understood that the scope of this invention is not limited to any specific positioning of the hinges 18 on the hub. A pair of U-shaped brackets 26 one secured to each blade at its oblique end may be provided. The portions 23 of the hinges may be rigidly connected one to each bracket and in parallel relation to the longitudinal axes of the blades. A pair of leaves 27 may be provided one for each blade if additional support is desired. The curled ends 28 of the leaves may be positioned one about each rod portion 22 between the ends of the U-shaped brackets 19, while the opposite flat ends 29 may be suitably secured one to the oblique edge 17 of each blade. A pair of crank arms 30 may be fixed one to the axle portion 22 of each hinge. The blade will thus be obliquely hinged in that the longitudinal axis of the blade will form an angle other than a right angle with the axis 24 of the hinge and, in the example shown, an angle of 30° is formed.

As to the blade control mechanism D, it may include a disc 31 threaded on the axle 10 in spaced relation to the hub and provided with a circumferential notch 32 for co-action with a headed and threaded stop pin 33 removably fixed at its headed end to the hub as by a suitable nut 34. A pair of links 35 each suitably pivoted at one end 36 to the periphery of the disc and suitably pivoted at the opposite end 37 one to each of the blade crank arms 30 may be provided in order that the hinging of the blades toward and away from a plane radial to the axle may be controlled and limited by the co-acting disc and stop pin. A pair of contractile coil springs 38 may be suitably anchored at one end to the hub. The opposite ends of the springs may be connected one to each link 35 at the end 37 in order to urge the hinged blades away from the radial plane toward which they are adapted to swing.

Referring now to the protective cover E, this may be in the form of a cup having an open end 40 and a closed end 41. The cover is adapted to be placed over the blade controlling mechanism and in this position, the open end 40 will abut the peripheral edge of the hub 13, it being understood that suitable notches 42 are provided in the wall of the cover for the accommodation of the outwardly extending portions of the hinges. The threaded axle may extend thru a suitable aperture in the end 41 and a nut 43 may be threaded thereon to hold the protective cover in place.

The operation of the improved wind power apparatus is as follows. When there is little or no wind the blades will be positioned out of a plane radial to the axle and will be pitched as shown in Figure 2 and the blade control mechanism will be positioned as shown in Figure 3 due to the action of the springs 38. When the wind strikes the blades it will tend to blow them backwardly toward the plane radial to the axle as represented in dotted lines in Figure 2. This tendency to swing backward will be resisted by the springs 38, but because the blades are pitched, they will begin to rotate, and thereby create a centrifugal force which will also tend to cause the blades to swing into a plane radial to the axle. If the wind is sufficiently strong the blades will swing against the resistance of the springs and their pitch will automatically decrease due to the obliquely hinged relation of the blades to the hub. It will thus be seen that as the wind velocity increases the pitch of the blades automatically decreases and the blades rotate at a substantially uniform rate of speed. However, during extremely high winds the blades will be blown backwardly until limited by the action of the stop pin on the disc as shown in Figure 4. In this position, the pitch of the blades will have decreased to substantially zero thereby causing the blades to slow down or stop entirely. The speed of rotation may be regulated by changing the strength or the number of springs. The pitch of the blades may be increased by removing the stop pin and the links 35 and threading the disc a suitable number of turns on the axle in the direction of the hub after which the stop pin and links may be replaced. The outer end 38 of the links will thereupon be drawn inwardly a predetermined distance, the blades will be swung farther away from the radial plane of the axle and the pitch of the blades will accordingly be increased.

A greater number of blades may be employed if desired and various other changes may be made to the form of invention herein shown and described without departing from the spirit of the invention or the scope of the following claims.

I claim:

1. Wind power apparatus comprising a threaded axle provided with a hub, a plurality of blades pivoted to the hub, a rotatable disc threaded on the axle in adjustably spaced relation to the hub, means limiting the rotation of the disc relative to the hub, and means connecting each blade to the disc.

2. A device of the class described comprising a threaded axle provided with a hub, a blade mounted on the hub and movable toward and away from a pitched position, means urging the blade toward the pitched position, but permitting the blade to move away from the pitched position when acted upon by a force of predetermined strength, a disc threaded on the axle in rotatable relation to the hub, means connecting the disc and blade, and means mounted on the hub and co-acting with the disc to limit movement of the blade toward and away from the pitched position.

3. A device of the class described comprising a threaded axle provided with a hub, blades mounted on the hub and movable toward and away from a pitched position, spring means anchored to the hub and urging the blades toward the pitched position but permitting the blades to move away from the pitched position when acted upon by centrifugal force, a disc threaded on the axle in rotatable relation to the hub, means operatively connecting the disc and blades, means mounted on the hub and co-acting with the disc to limit movement of the blades toward and away from the pitched position, a protective cover on the axle and cover securing means threaded on the axle.

4. A device of the class described comprising a threaded axle, a hub secured thereon, blades mounted on the hub and movable toward and away from a pitched position, controlling mechanism for the blades including a disc rotatably threaded on the axle, a cover mounted on the axle and co-acting with the hub to protect the controlling mechanism and cover securing means threaded on the axle.

5. A device of the character described comprising an axle provided with a hub, a bracket secured on the hub, an angularly bent rod having one leg rotatably mounted in the bracket, means for controlling the rotation of said leg, and a blade mounted on the opposite leg of said rod.

6. A device of the character described comprising an axle provided with a hub, a U-shaped bracket secured on the hub, an angularly bent rod having one leg rotatably mounted in the bracket, means for controlling the rotation of said leg, an elongate leaf having one end mounted on said leg, and a blade mounted on the other leg of the angularly bent rod, said elongate leaf at its opposite end being secured to said blade.

HERCEL JOSEPH LUDEWIG.